(12) United States Patent
Aamodt

(10) Patent No.: US 11,149,895 B2
(45) Date of Patent: Oct. 19, 2021

(54) ARRANGEMENT FOR SEPARATING A CONNECTION BETWEEN TWO PRESSURIZED FLANGED TUBE SECTIONS

(71) Applicant: IK-Norway AS, Stavanger (NO)

(72) Inventor: Kjetil Aamodt, Lye (NO)

(73) Assignee: IK-Norway AS, Stavanger (NO)

( * ) Notice: Subject to any disclaimer, the term of this patent is extended or adjusted under 35 U.S.C. 154(b) by 288 days.

(21) Appl. No.: 16/464,750

(22) PCT Filed: Aug. 18, 2017

(86) PCT No.: PCT/NO2017/050206
§ 371 (c)(1),
(2) Date: May 29, 2019

(87) PCT Pub. No.: WO2018/101835
PCT Pub. Date: Jun. 7, 2018

(65) Prior Publication Data
US 2019/0316724 A1    Oct. 17, 2019

(30) Foreign Application Priority Data
Nov. 29, 2016 (NO) .................................. 20161899

(51) Int. Cl.
*F16L 55/10* (2006.01)
*F16L 55/105* (2006.01)
(Continued)

(52) U.S. Cl.
CPC .......... *F16L 55/105* (2013.01); *F16K 3/0281* (2013.01); *F16L 41/06* (2013.01)

(58) Field of Classification Search
CPC ........ F16L 55/105; F16L 41/06; F16K 3/0281
(Continued)

(56) References Cited

U.S. PATENT DOCUMENTS 2,278,849 A * 4/1942 Hamer .................... F16K 3/312
138/94.3
2,570,545 A * 10/1951 Hamer ...................... F16K 3/20
285/94
(Continued)

FOREIGN PATENT DOCUMENTS

CN    1265727    9/2000
GB    2296305    6/1996
(Continued)

OTHER PUBLICATIONS

Norwegian Search Report, Norwegian Patent Application No. 20161899, dated Jun. 29, 2017.
(Continued)

*Primary Examiner* — James F Hook
(74) *Attorney, Agent, or Firm* — Andrus Intellectual Property Law, LLP

(57) ABSTRACT

An arrangement is for separating a connection between two pressurized flanged tube sections. The arrangement comprises a first type element having a first body adapted to be arranged around a flange of a first tube section, and which first body comprising a first sealing arrangement, and a second type element comprising a second body adapted to be arranged around a flange of a second tube section, and which second body comprising a second sealing arrangement. The second type element further comprises a displaceable obstruction. The first and the second type elements are adapted to form a sealed compartment that allows the flanges of the tube sections to be displaced away from each other so that a gap is formed, which allows the obstruction to enter and isolate the second tube section.

26 Claims, 11 Drawing Sheets

(51) Int. Cl.
*F16K 3/02* (2006.01)
*F16L 41/06* (2006.01)

(58) Field of Classification Search
USPC ........................................ 138/94, 94.3, 94.5
See application file for complete search history.

(56) References Cited

U.S. PATENT DOCUMENTS

| | | | | |
|---|---|---|---|---|
| 2,664,918 A * | 1/1954 | Hamer | ................... | F16K 3/312 |
| | | | | 138/94.3 |
| 2,732,170 A * | 1/1956 | Shand | ................... | F16K 3/0227 |
| | | | | 251/172 |
| 2,800,926 A * | 7/1957 | Handley | ................. | F16K 3/312 |
| | | | | 138/94.5 |
| 2,889,853 A * | 6/1959 | Eldon | .................... | F16K 3/312 |
| | | | | 138/94.3 |
| RE26,238 E * | 7/1967 | Snell | ........................ | F16K 3/312 |
| | | | | 138/94.3 |
| 4,022,241 A * | 5/1977 | Fox | ......................... | F16K 3/312 |
| | | | | 137/240 |
| 4,171,142 A | 10/1979 | Harrison et al. | | |
| 4,257,447 A * | 3/1981 | Clarkson | ............... | F16K 3/0281 |
| | | | | 137/375 |
| 4,271,870 A | 6/1981 | Butler et al. | | |
| 4,355,656 A * | 10/1982 | Smith | ................... | F16L 55/105 |
| | | | | 137/318 |
| 4,503,594 A * | 3/1985 | Gall | ......................... | G01F 1/42 |
| | | | | 138/41 |
| 6,776,184 B1 | 8/2004 | Maichel et al. | | |
| 2002/0021004 A1 | 2/2002 | Mitchell et al. | | |

FOREIGN PATENT DOCUMENTS

| | | |
|---|---|---|
| GB | 2 341 432 | 3/2000 |
| WO | 2002/086375 | 10/2002 |

OTHER PUBLICATIONS

International Search Report, PCT/NO2017/050206, dated Oct. 23, 2017.
Written Opinion, PCT/NO2017/050206, dated Oct. 23, 2017.
Written Opinion, PCT/NO2017/050206, dated Oct. 26, 2017.

\* cited by examiner

ARRANGEMENT FOR SEPARATING A CONNECTION BETWEEN TWO PRESSURIZED FLANGED TUBE SECTIONS

CROSS-REFERENCE TO RELATED APPLICATIONS

This application is the U.S. national stage application of International Application PCT/NO2017/050206, filed Aug. 18, 2017, which international application was published on Jun. 7, 2018, as International Publication WO 2018/101835 in the English language. The International Application claims priority of Norwegian Patent Application No. 20161899, filed Nov. 29, 2016. The international application and Norwegian application are both incorporated herein by reference, in entirety.

INTRODUCTION

The present invention relates to an arrangement for separating a connection between two pressurized flanged tube sections. The invention furthermore relates to a method for separating a connection between two pressurized flanged tube sections by means of the arrangement and a method for re-establishing a connection of a first tube section to a pressurized isolated second tube section by means of the arrangement. The invention furthermore relates to use of the arrangement according to the invention.

PRIOR ART

When a tubing for conducting a fluid or gas, such as a pipeline for oil, condensate and/or gas, is to be repaired, it is necessary to temporary isolate a relevant section of the tubing. The repair may for example involve valve repair/replacement, leak repair, corrosion repair, etc. on the tubing.

Prior art methods for such isolation rely on use of expandable displacement elements that are displaced in the tubing by means of the conduction of the fluid. A problem with prior art expandable displacement elements is that they are expensive and the supply is restricted to few suppliers. Furthermore, the tubing needs to be prearranged with means for introducing such expandable displacement elements into the tubing. It is also known from prior art to plug a tubing by "freeze plugging" in which water or other medium is frozen to a plug. However, prior art methods for forming such freeze plugs suffer from the disadvantage of being insufficiently controlled and requiring that the tubing is filled with a suitable medium to certain extent that enables the medium to be frozen to a plug.

Alternative to plugging the tubing by means of expandable displacement elements or freeze plugging, the full length of the tubing can be depressurized and evacuated for medium. For a pipeline constituting considerable length, this operation is both costly and time consuming, and is accordingly avoided if possible.

SUMMARY OF THE INVENTION

The invention has for its object to remedy or to reduce at least one of the drawbacks of the prior art, or at least provide a useful alternative to prior art. A first object of the invention is to provide an arrangement and a method that enable separation of a connection between two flanged tube sections while being pressurized and without involving permanent intrusive measures on the connection. A second object of the invention provide an arrangement a method that enable replacement of a tube section and reconnection of a replacement tube section to such pressurized tube section. A third object of the invention is to provide an arrangement that can be used in multiple operation of separation, replacement and reconnection to such pressurized connection of tube sections.

These objects are achieved by means of an arrangement according to claim 1 for separating a connection between two pressurized flanged tube sections. The arrangement comprises:
 a first type element comprising a first body adapted to be arranged around a flange of a first tube section of said connection, and which first body comprising a first sealing arrangement,
 a second type element comprising a second body adapted to be arranged around a flange of a second tube section of said connection, and which second body comprising a second sealing arrangement, and
 wherein the second type element further comprises a displaceable obstruction,
 wherein the first type element and the second type element are adapted to form a sealed compartment between the flange of the first tube section and the flange of the second tube section, and the first sealing arrangement and the second sealing arrangement are adapted to maintain the sealing of the sealed compartment while allowing the flange of the first tube section and the flange of the second tube section to be displaced away from each other so that a gap is formed, which allows the obstruction to enter and isolate the second tube section.

The first type element and the second type element are separate parts that are adapted to be attached to the respective flange of the first tube section and the flange of the second tube section. The connection of the first tube section and the second tube section is pressurized so that a pressure difference is present that acts to induce a flow of a medium in a direction from the second tube section to the first tube section.

By means of the first and second sealings, the first type element and the second type element form the sealed compartment over the flanges of the two tube sections that allows the first flange of the first tube section and the flange of the second tube section to be displace away from each other while being contained within the sealed compartment, and thereby forming the gap within the sealed compartment. After the flanges has been displace away from each other so that a sufficient wide gap has been formed, the obstruction is allowed to be displaced into the gap and thereby isolating the second tube section from the first tube section. The isolation of the second tube section allows the first tube section to be drained from medium so that the first tube section and possible valve or other equipment connected to the first tube section to be replaced and reconnected to the second tube section again.

Accordingly, the arrangement of the invention provides an alternative to prior art devices and methods for separating a connection of a first tube section and second tube section from each other in a pressurized state. The arrangement provides a separation of the pressurized connection without involving permanent intrusive measures on the connection. The arrangement also has the advantage of allowing separation of pressurized connection of tubings without means for launching expandable displacement elements and not being provided with a medium to an extent or suitable to form a freeze plug.

According to an embodiment of the invention, the first sealing arrangement comprises a first sealing adapted to be in abutment with the flange of the first tube section and the second sealing arrangement comprises a second sealing adapted to be in abutment with the flange of the second tube section. The first sealing and the second sealing seal the connection in order to prevent a leakage of the medium outside the flanges of the respective tube sections.

According to an embodiment of the invention, the first sealing and the second sealing are ring-formed and are adapted to abut along the outer circumference of the flanges of the respective first tube section and second tube section. By means of the first sealing and the second sealing, the full circumference of the flanges of the respective tube sections are sealed to maintain the medium within the sealed compartment.

According to an embodiment of the invention, the second type element further comprises a guide member adapted to guide the displacement of the obstruction from an open position in which the obstruction is outside said gap between the flanges and a closed position in which the obstruction isolates an opening of the second tube section.

According to an embodiment of the invention, the obstruction comprises a disc shaped member with a size configured to extend over the opening of the second tube section.

By means of the obstruction, the second type element functions as a valve. In the open position of the obstruction, the medium is allowed passing through the opening of the second tube section. In the closed position of the obstruction, the medium is prevented from passing through the opening of the second tube section.

According to an embodiment of the invention, the guide member comprises a channel in the second body. The guide member facilitates the displacement of the obstruction between the open and closed position.

According to an embodiment of the invention, wherein the arrangement comprises an entrance to the channel for introducing the obstruction and a lock device for controllably closing and opening the entrance to the channel.

By means of the lock device the entrance to the channel can be controllably closed and opened for introducing the obstruction other tools is adapted to be introduced into the closed compartment between the first type element and the second type element.

According to an embodiment of the invention, the lock device comprises a further obstruction that is controllably displaceable into and out of the entrance to the channel.

By means of the lock device, the entrance to the channel comprises an open state in which the obstruction is adapted to be introduced or removed from the channel, and a closed state in which the entrance to the channel is closed. In the open state, the obstruction or other tools is adapted to be introduced into the closed compartment. In the closed state, the further obstruction closes the entrance to the closed compartment between the first type element and the second type element.

According to an embodiment of the invention, the arrangement further comprises a cleansing tool adapted to be introduced into the gap between the flange of the first tube section and the flange of the second tube section.

In some application, it is desirable to remove corrosion from the flanges, or to remove a sealing from the flanges with a new sealing while the first tube section and second tube section while being in a pressurized state.

According to an embodiment of the invention, the cleansing tool comprises a structure holding one or more abrasive members for engaging with at least one of the flanges of the first tube section and the second tube section. By means of the one or more abrasive members of the cleansing tool, the surface of the flanges can be improved and a sealing between the flanges can be removed.

According to an embodiment of the invention, the arrangement comprises a further guide member for guiding the introduction of the obstruction into the channel, which further guide member is removable connected to the second type element. By means of the further guide member, introduction of the obstruction and other tools, such as the cleansing tool, into the channel is facilitated. By means of the further guide member is configured removable connected to the second type element, the extent of the arrangement is reduced when the arrangement is assembled at the connection and the arrangement is not actively operated by introducing or removal of the obstruction or other tools into the channel.

According to an embodiment of the invention, the arrangement comprises a connection device for removable connecting the further guide member to the second type element. The connection device is for example a bolted connection.

According to an embodiment of the invention, the arrangement further comprises a third sealing arrangement between the second body and the obstruction. By means of the third sealing arrangement, it is assured that the medium does not leak into a channel for the obstruction or to outside the sealed compartment.

According to an embodiment of the invention, the third sealing arrangement comprises a pair of third sealings. The pair of third sealings are arranged to abut on opposite sides of the obstruction.

According to an embodiment of the invention, the first body comprises a first flanged part and the second body comprises a second flanged part, and the arrangement further comprises a connection assembly for connecting the first flange part and the second flanged part together adjustable spaced apart from each other.

The first flanged part and second flanged part are parts of the respective first body and second body that extend away from the respective flange of the first tube section and section tube section. By means of the first flanged part and second flanged part, the first type element and second type element are maintained connected together by means of the connection assembly after the bolt assembly of the connection between the first and second tube section has been released.

The connection assembly between the first flanged part and second flanged part are used to adjust the separation between the first type element and second type element as the flanges of the first and second tube sections are displaced away from each other for the purpose of forming the gap for insertion of the obstruction.

According to an embodiment of the invention, the first body comprises a protruding part adapted to protrude perpendicular to the extension of the first flanged part and the second body comprises a recess directed perpendicular to the extension of the second flanged part, wherein the shape of the protruding part and the shape of the recess are complementary for enabling displacement of the protruding part within the recess.

According to an embodiment of the invention, the protruding part of the first body comprises a tubular element and the recess of the second body comprises a tubular depression.

The recess of the second body and the protrusion of the first body are shaped complementary for enabling displacement of the protrusion within the recess with direct contact or a small sized tolerance between them in order to accommodating formation of the gap between the flanges of the tube sections. Thereby, the first type element and second type element together forms the sealed compartment over the connection of tube sections while enabling displacement of the protruding part in relation to the recess.

According to an embodiment of the invention, the arrangement comprises a fourth sealing arrangement positioned in abutment between a wall section of said protruding part and a wall section of said recess. The fourth sealing arrangement is adapted to allow a displacement of the protruding part in relation to the recess without a leakage of the medium from the sealed compartment.

According to an embodiment of the invention, the fourth sealing arrangement comprises a fourth ring-formed sealing. The fourth sealing is positioned between the protruding part and the recess so that it extends along the circumference of the protruding part and the recess.

According to an embodiment of the invention, the first body and the second body comprises respective openings for enabling removal of one or more bolts of a bolt assembly between the flange of the first tube section and the flange of the second tube section. The bolt assembly needs to be released after the first type element and the second type element have been arranged at the respective tube section in order to enable the flanges of the connection to be displace away from each other for forming the gap between them.

According to an embodiment of the invention, each of the first body and the second body are ring shaped comprising an opening to accommodate the respective flanges of the first tube section and the second tube section.

According to an embodiment of the invention, each of the first body and the second body comprises a split that enables the first body and the second body to be arranged around the respective flanges of the first tube section and the second tube section. Preferably, the first body and the second body each comprises two parts that are adapted to be attached around the respective flange of the tube section.

The object of the invention is further obtained by a method according to claim 19 for separating a connection between two pressurized flanged tube sections by means of an arrangement. The arrangement comprises a first type element comprising a first body comprising a first sealing arrangement, and a second type element comprising a second body comprising a second sealing arrangement, and wherein the second type element further comprises a displaceable obstruction, wherein the method comprises:

arranging the arrangement on the connection so that the first type element is positioned around a flange of a first tube section and the second type element is positioned around a flange of a second tube section, and so that the first type element and the second type element form a sealed compartment between the flange of the first tube section and the flange of the second tube section, arranging a connection assembly so that the first type element and second type element exert a force on the flanges of the first tube section and the second tube section, removing one or more bolts of a bolt assembly between the flange of the first tube section and the flange of the second tube section, displacing the flange of the first tube section and the flange of the second tube section away from each other so that a gap is formed within the sealed compartment between the flange of the first tube section and the flange of the second tube section, and displacing the obstruction into the gap between the flange of the first tube section and the flange of the second tube section.

In the steps of arranging the first type element and second type element around the flanges of the respective tube section, sealed connections to the respective flange of the first and second tubing section are provided. Thereby, a sealed compartment is formed between the flanges of the two tube sections. Thereafter, a connection assembly is arranged for holding the first type element and second type element together, and the bolt assembly of the connection of the two tube section are removed. Thereafter, the flanges of the two tube sections is displaced away from each other so that the gap is formed between the flanges. The displacement may be induced by the internal pressure of the connections after the bolt assembly has been released. Alternatively, the flanges may be displaced by applying a force to the connection in order to separate the flanges from each other and forming the gap for the obstruction. After the gap has been formed and the obstruction has been displaced to the closed position, the second tube section has been isolated from the first tube section.

According to an embodiment of the invention, the method further comprises plugging one or more opening in in the flanges of the first tube section and the second tube section formed after the removal of the bolt assembly.

According to an embodiment of the invention, the method further comprises arranging the first type element around a flange of a first tube section of said connection, and arranging the second type element around a flange of a second tube section of said connection so that the first type element and the second type element form a sealed compartment between the flange of the first tube section and the flange of the second tube section.

According to an embodiment of the invention, the method further comprises removing one or more plugs from one or more openings in the flanges of the first tube section and the second tube section prior to connecting one or more bolts to form a bolt assembly between the flanges.

According to an embodiment of the invention, the method further comprises disconnecting the connection assembly between the first type element and second type element, separating the first type element from the second type element, draining the first tube section and possible tube sections connected to the first tube section, and removing the first tube section from the connection.

After the gap has been formed and the obstruction has been displaced to the closed position, the second tube section has been isolated from the first tube section and the first tube section is drained from the medium. Thereafter, the connection assembly is disconnected and the first type element and second type element are separated from each other, which enables the first tube section to be removed and replaced with a replacement first tube section and possible valve or other equipment connected to the replacement first tube section.

The object of the invention is further obtained by means of a method according to claim 23 for reestablishing a connection of a first tube section to a pressurized isolated second tube section by means of an arrangement. The arrangement comprises a first type element comprising a first body with a first sealing arrangement, and a second type element comprising a second body with a second sealing arrangement, and wherein the second type element further comprises a displaceable obstruction, where the second type element is arranged around a flange of the second tube section, wherein the method comprises:

positioning the first tube section next to the second tube section, arranging the first type element around a flange of the first tube section of said connection to be formed so that the first type element and the second type element form a sealed compartment between the flange of the first tube section and the flange of the second tube section, arranging a connection assembly for connecting the first type element and second type element together, displacing the obstruction out of a gap between the flanges of the two tube sections, connecting one or more bolts to form a bolt assembly between the flange of the first tube section and the flange of the second tube section, and displacing the flange of the first tube section and the flange of the second tube section towards each other so that said gap formed between the flanges of the two tube sections is closed.

According to an embodiment of the method comprises:

removing one or more plugs from one or more opening in the flanges of the first tube section and the second tube section prior to connecting one or more bolts to form a bolt assembly between the flanges.

According to an embodiment of the invention, the method comprises:

tightening the bolt assembly between the flange of the first tube section and the flange of the second tube section, and removing the first type element from the first tube section and the second type element from the second tube section.

The object of the invention is further obtained by means of a method according to claim 26 for reestablishing a connection of a first tube section to a pressurized isolated second tube section by means of an arrangement comprising a first type element comprising a first body with a first sealing arrangement, and a second type element comprising a second body with a second sealing arrangement, and wherein the second type element (12) further comprises a displaceable obstruction, where the first type element is positioned around a flange of a first tube section and the second type element is positioned around a flange of a second tube section so that the first type element and the second type element form a sealed compartment between the flange of the first tube section and the flange of the second tube section, wherein the method comprises the steps of:

connecting one or more bolts to form a bolt assembly between the flange of the first tube section and the flange of the second tube section, displacing the obstruction out of a gap between the flanges of the two tube sections, and displacing the flange of the first tube section and the flange of the second tube section towards each other so that said gap formed between the flanges of the two tube sections is closed.

According to an embodiment of the invention, the method comprises:

removing one or more plugs from one or more opening in the flanges of the first tube section and the second tube section prior to connecting one or more bolts to form a bolt assembly between the flanges.

According to an embodiment of the invention, the method comprises:

tightening the bolt assembly between the flange of the first tube section and the flange of the second tube section, and removing the first type element from the first tube section and the second type element from the second tube section.

The object of the invention is furthermore obtain by use of an arrangement according to any of claim 1-18.

BRIEF DESCRIPTION OF DRAWINGS

In the following is described examples of preferred embodiments illustrated in the accompanying drawings, wherein.

Figure 1:
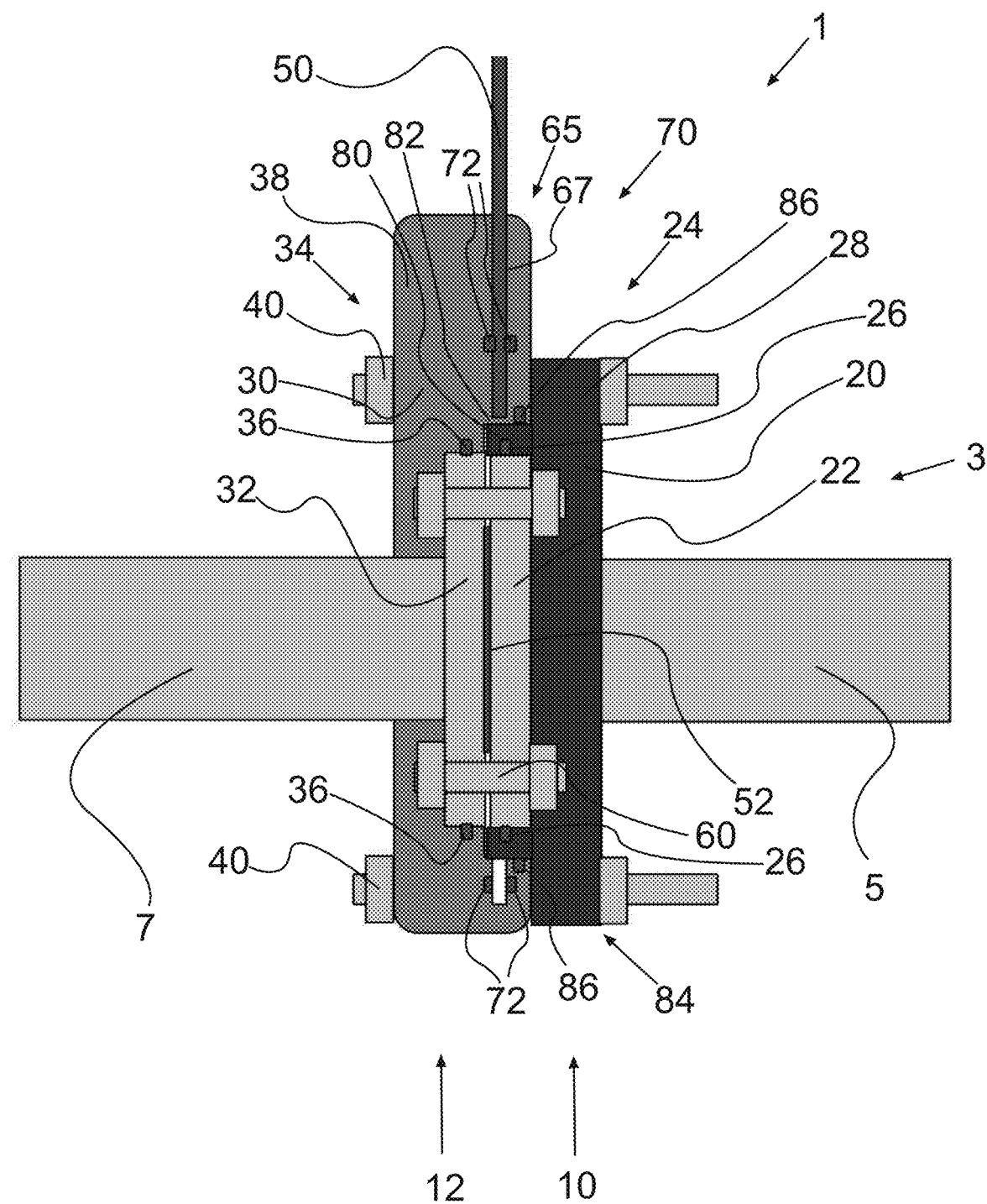
FIG. 1-5 discloses different stages of using an arrangement according to an embodiment of the invention for separating a connection between two pressurized flanged tube sections.
Figure 2:
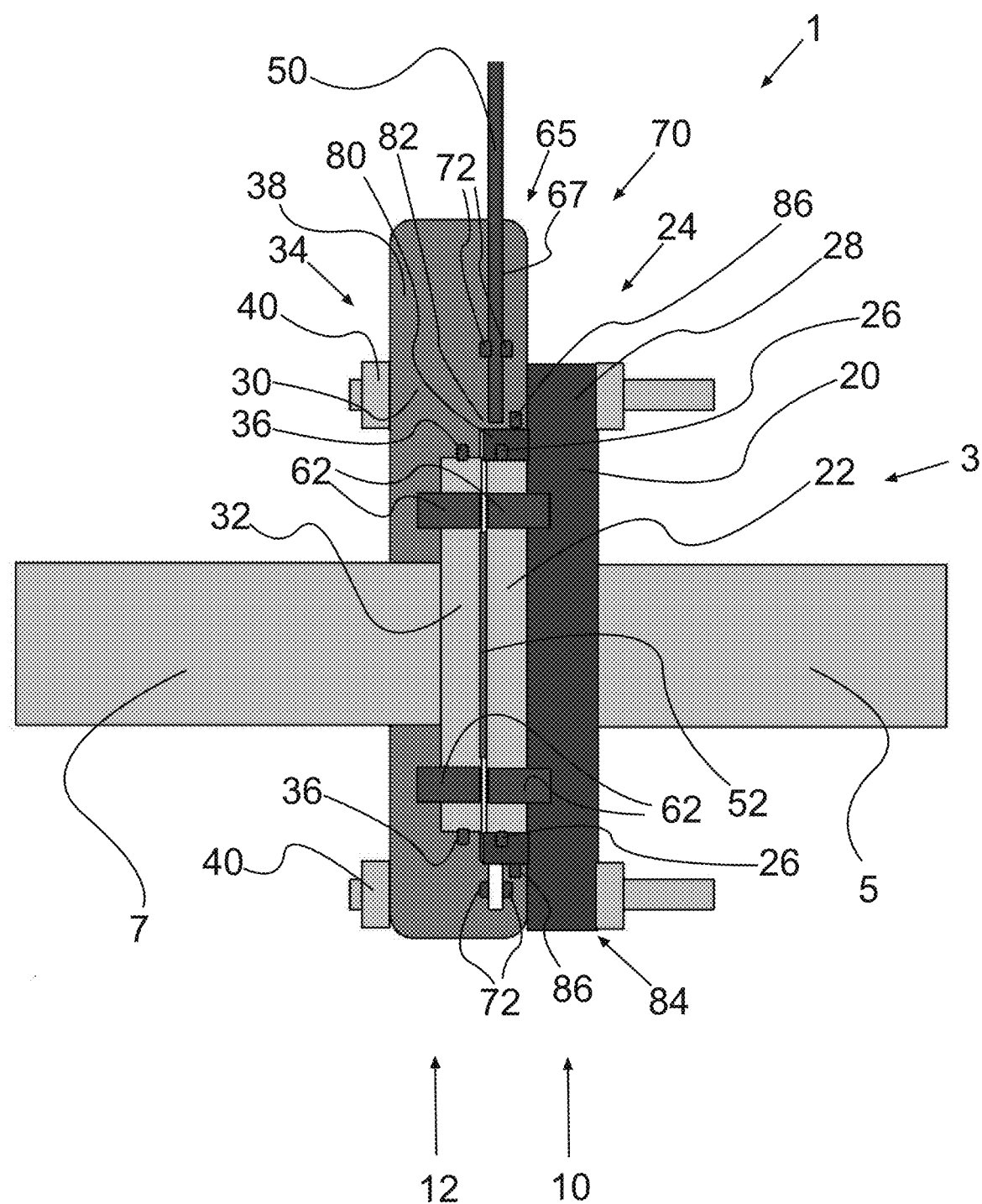
Figure 3:
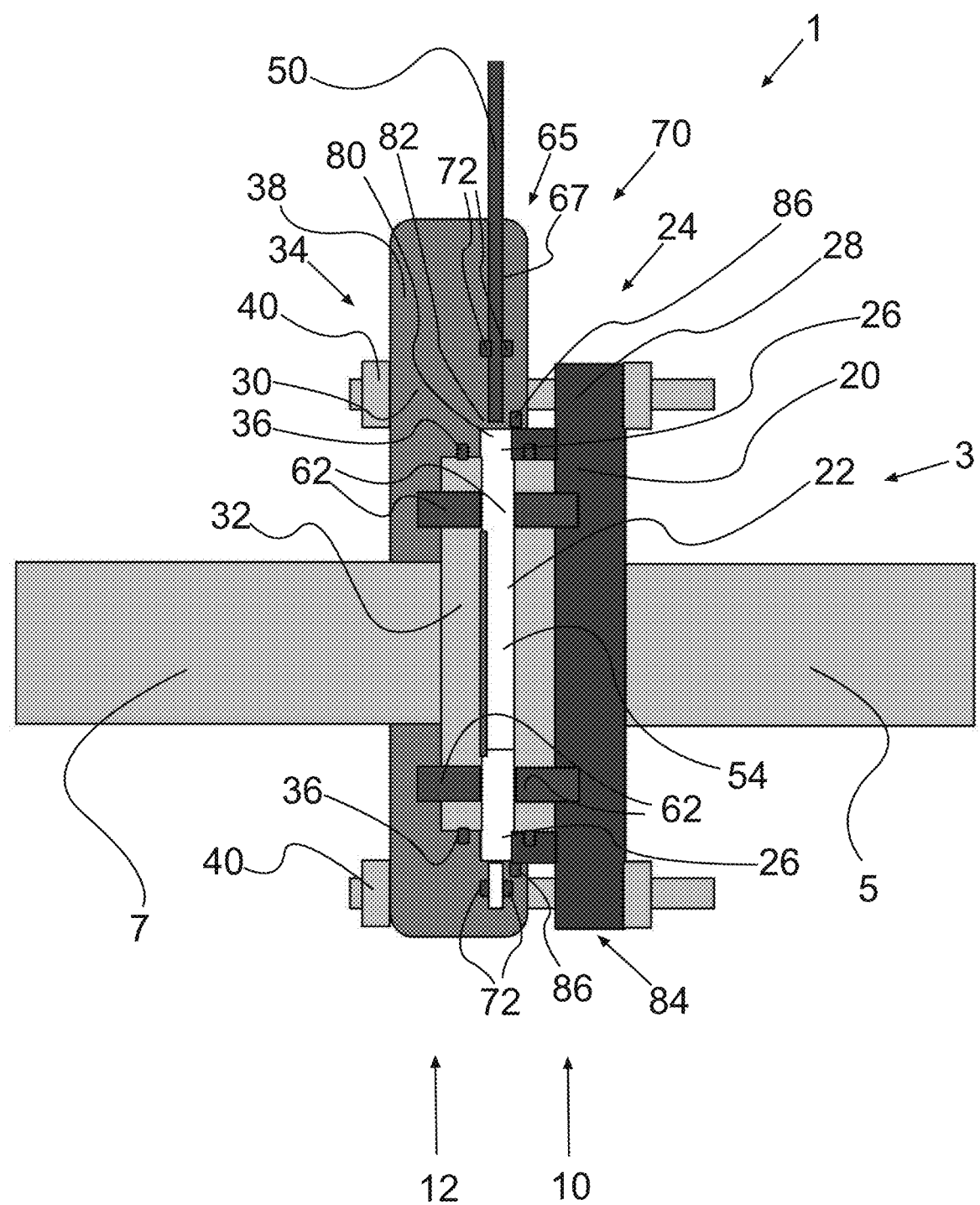
Figure 4:
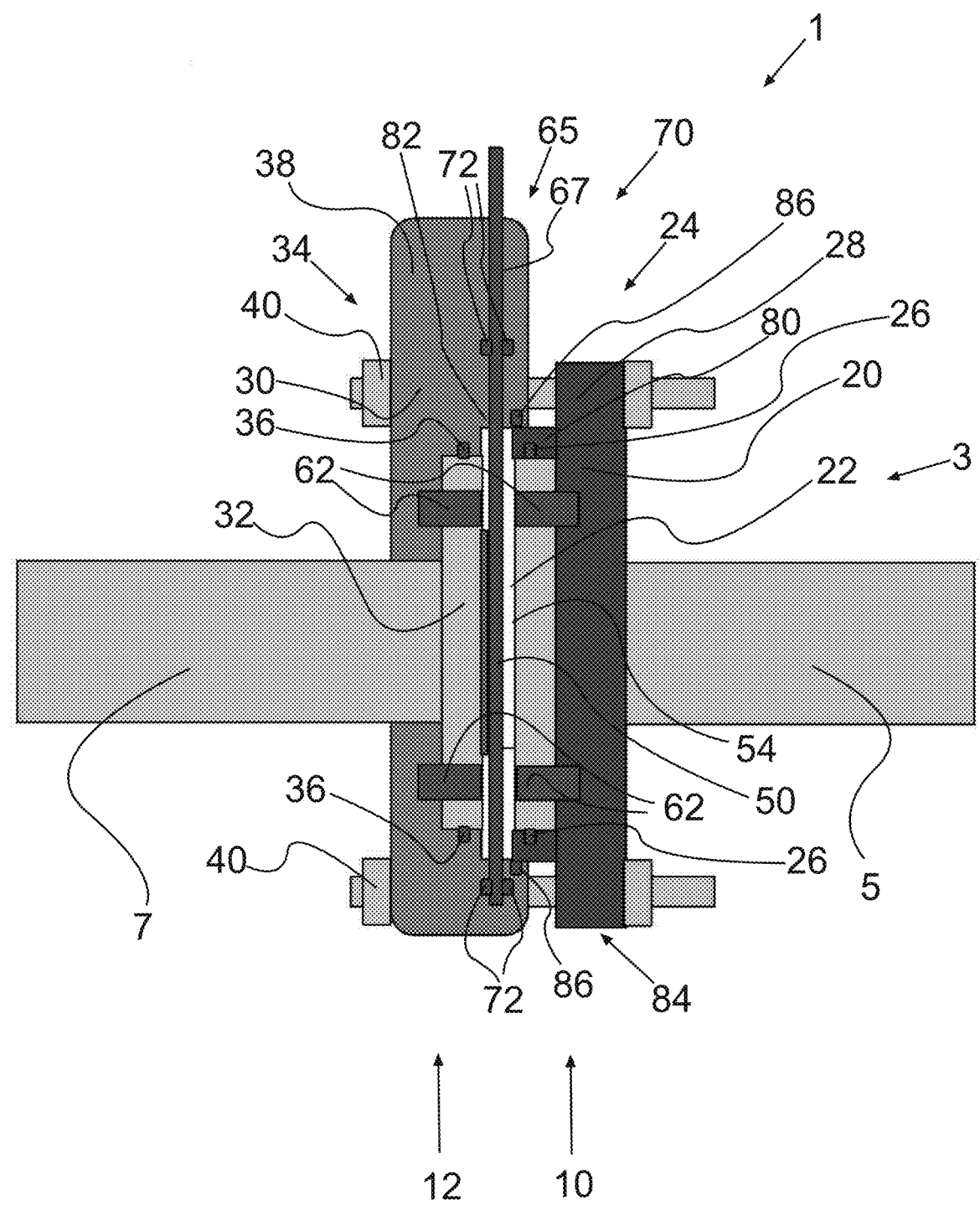
Figure 5:
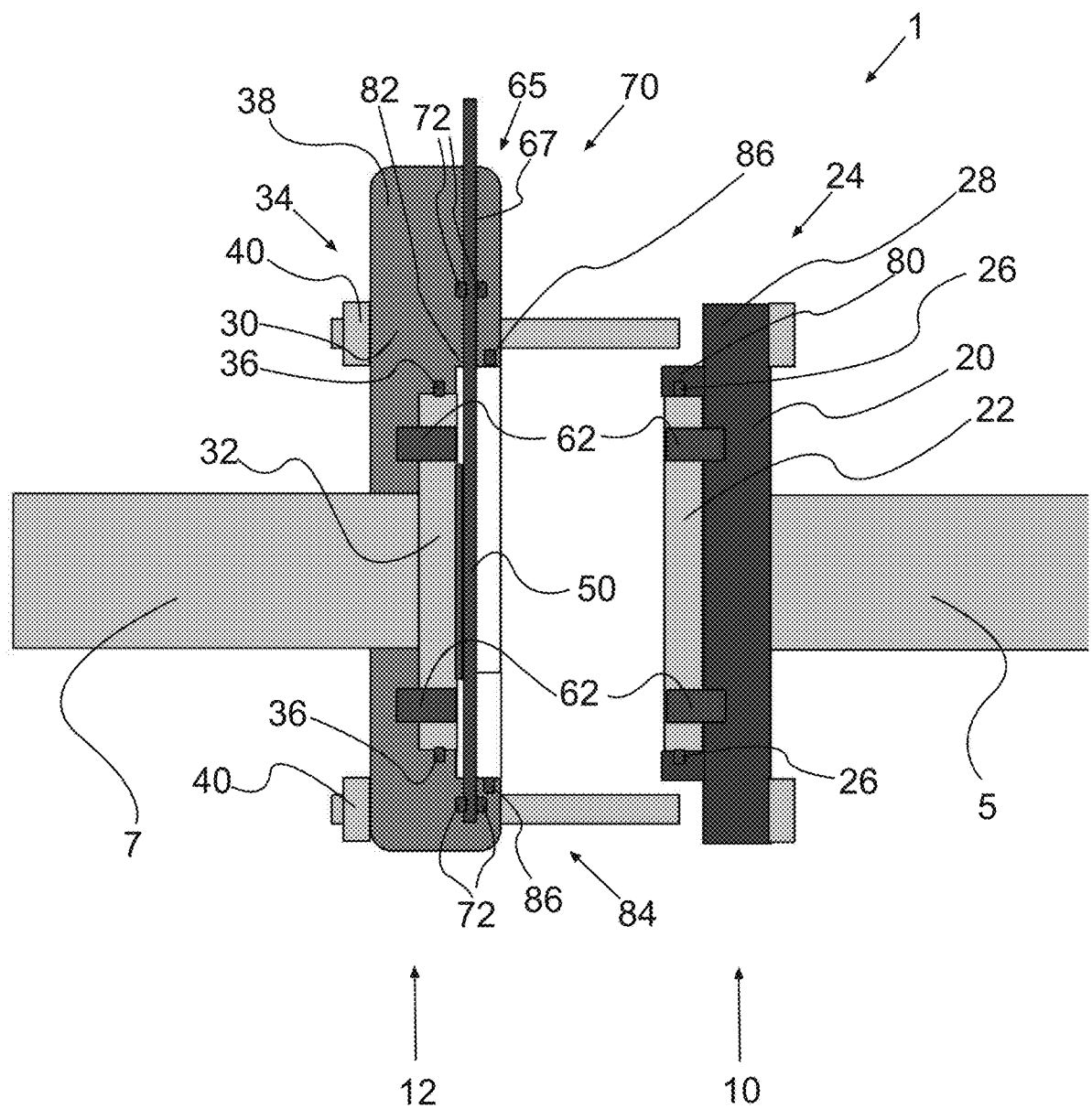

In particular:

FIG. 1 discloses a first stage in which a first type element and a second type element of the arrangement of the invention have been attached to the flanges of the two tube sections;

FIG. 2 discloses a second stage in which bolts of a bolt assembly between flanges of the two tube sections have been removed and corresponding openings have been plugged;

FIG. 3 discloses a third stage in which the two tube sections have been displaced away from each other to form a gap between them;

FIG. 4 discloses a fourth stage in which an obstruction of the arrangement has been displaced into the gap; and FIG. 5 discloses a fifth stage in which the first type element and the second type element are separated from each other and the first tube section is removed.

DETAILED DESCRIPTION

In FIG. 1-5 different stages of using of an arrangement 1 according to an embodiment of the invention for separating a pressurized connection 3 between a first tube section 5 and a section tube section 7 are disclosed. An embodiment of the arrangement 1 will now be explained with reference to FIG. 1-5.

FIG. 1 discloses a first stage of a separating the pressurized connection 3 between the first tube section 5 and the section tube section 7. The connection 3 is pressurized so that a pressure difference is present that acts to induce a flow of a medium in a direction from the second tube section 7 to the first tube section 5.

The arrangement 1 comprises a first type element 10 and a second type element 12 that are adapted to cooperatively enable the separation of the pressurized connection 3. The first type element 10 and second type element 12 are separate parts of the arrangement 1.

The first type element 10 comprising a first body 20 that has been arranged around a flange 22 of the first tube section 5 of the connection 3. The first type element 10 further comprises a first sealing arrangement 24 arranged between the flange 22 of the first tube section 5 and the first body 20. The first sealing arrangement 24 comprises a first sealing 26, such a sealing ring extending along the circumference of the flange 22 of the first tube section 5. The first sealing arrangement 24 prevents a leakage of the medium to an outside of the first type element 10.

The first body 20 further comprises a first flanged part 28 that extends in a direction away from the flange 22 of the first tube section 5. In the disclosed embodiment, the first flanged part 28 extends in parallel and beyond the extension of the flange 22 of the first tube section 5. The first flanged part 28 has the function of providing a structure for a connection of the first part element 10 to the section type element 12.

Correspondingly, the second type element 12 comprising a second body 30 that has been arranged around a flange 32 of the second tube section 7 of the connection 3. The second type element 12 further comprises a second sealing arrangement 34 arranged between the flange 32 of the second tube section 7 and the second body 30. The second sealing arrangement 34 comprises a second sealing 36, such a sealing ring extending along the circumference of the flange 32 of the second tube section 7. The second sealing arrangement 34 prevents a leakage of the medium to an outside of the second type element 12.

The second body 30 further comprises a second flanged part 38 that extends in a direction away from the flange 32 of the second tube section 7. In the disclosed embodiment, the second flanged part 38 extends in the direction and beyond the extension of the flange 32 of the second tube section 7. The arrangement 1 further comprises a connection assembly 40 for connecting the first flange part 28 and the second flanged part 38 together and adjustable spaced apart from each other. The connection assembly 40 comprises for example one or more bolts arranged in the first flanged part 28 and the second flanged part 38.

The second type element 12 further comprising a displaceable obstruction 50, which will be discussed in further details in the following.

When arranged as in FIG. 1, the first type element 10 and the second type element 12 form a sealed compartment 52 between the flange 22 of the first tube section 5 and the flange 32 of the second tube section 7. The extent of the sealed compartment 52 is adjusted by means of the connection assembly 40.

The first sealing arrangement 24 and the second sealing arrangement 34 are adapted to maintain the sealing of the sealed compartment 52 while allowing the flange 22 of the first tube section 5 and the flange 32 of the second tube section 7 to be displaced away from each other so that a gap 54 is formed of a size that allows the obstruction 50 to enter the gap 54 and isolate an opening of the second tube section 7. See FIG. 3 relating to a third stage in which the two tube sections 5, 7 have been displaced away from each other to form the gap 54 between them, and FIG. 4 relating to a fourth stage in which the obstruction 50 has been displaced into the gap 54.

The connection 3 of the two tube sections 5, 7 comprises a bolt assembly 60 that holds the flanges 22, 32 together. The first body 20 and the second body 30 comprises respective openings (not disclosed) for enabling removal of one or more bolts of the bolt assembly 60. The corresponding openings in the flanges 22, 32 of the tube sections 5, 7 should preferably prior to a displacement of the flanges 22, 32 be provided with plugs 62 in order to prevent a leakage of the medium. See FIG. 2 relating to a second stage in which bolts of the bolt assembly 60 between the flanges 22, 32 of the two tube sections 5, 7 have been removed and corresponding openings in the flanges 22, 32 have been provided with plugs 62.

The second type element 12 further comprises a guide member 65 adapted to guide the displacement of the obstruction 50 from an open position in which the obstruction 50 is outside the gap 54 between the flanges 22, 32 and a closed position in which the obstruction 50 isolates an opening of the second tube section 7. Preferably, the guide member 65 comprises a channel 67 in the second body 30.

The arrangement 1 preferably further comprises a third sealing arrangement 70 between the second body 30 and the obstruction 50. In the disclosed embodiment, the third sealing arrangement 70 comprises a pair of third sealings 72 provided on opposite sides of the obstruction 50.

The arrangement 1 is configured so that the first body 20 of the first type element 10 comprises a protruding part 80 adapted to protrude perpendicular to the extension of the first flanged part 28. Correspondingly, the second body 30 of the second type element 12 comprises a recess 82 directed perpendicular to the extension of the second flanged part 38. The shape of the protruding part 80 and the shape of the recess 82 are complementary so to enabling displacement of the protruding part 80 within the recess 82. In FIG. 1, the protruding part 80 is fully inserted in the recess 82. In FIG. 3, the protruding part 80 has been partly displaced out of the recess 82 to a position in which the protruding part 80 still is within the recess 82.

In the disclosed embodiment in FIG. 1-5, the protruding part 80 of the first body 20 comprises a tubular element and the recess 82 of the second body 30 comprises a tubular depression. However, it shall be understood that various complementary arrangements of the protruding part 80 and recess 82 are possible.

The arrangement 1 further comprises a fourth sealing arrangement 84 positioned in abutment between a wall section of the protruding part 80 and a wall section of the recess 82. In the disclosed embodiment, the fourth sealing arrangement 84 comprises a ring formed fourth sealing 86. The fourth sealing arrangement 84 is adapted to prevent a leakage of the medium from the sealed compartment 52 while allowing a displacement of the first type element 10 and second type element 12 away from each other when forming the gap 54 between the flanges 22, 32 of the two tube sections 5, 7.

After that the gap 54 between the flanges 22, 32 of the two tube sections 5, 7 has been formed and the obstruction 50 has been displaced from the open position outside the gap 54 to the closed position inside the gap 54, the connection 3 between the first type element 10 and the second type element 12 can be released and the first tube section 5 can be removed from the connection 3, see FIG. 5.

Figure 6:
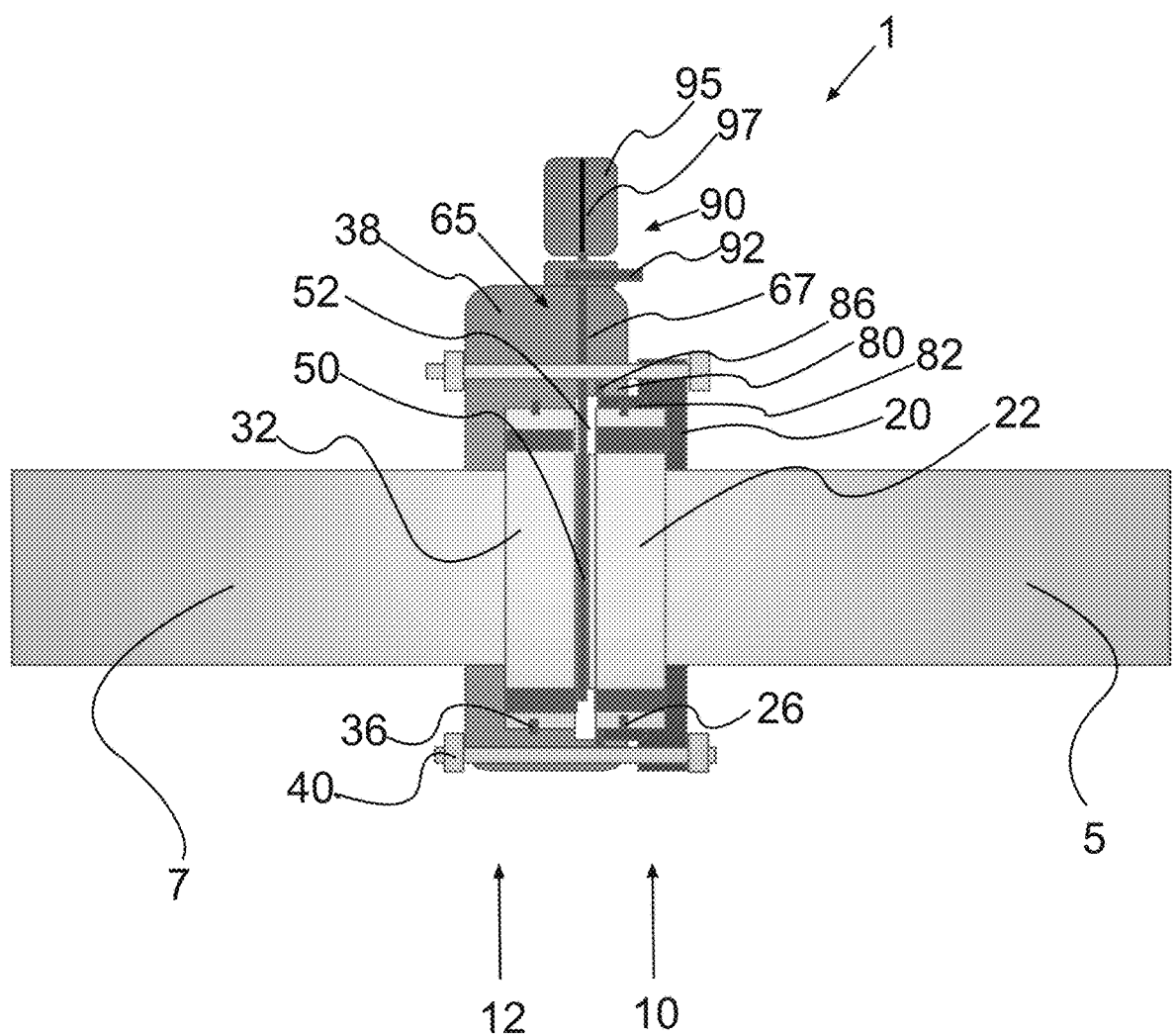
FIG. 6 discloses an arrangement according to a further embodiment of the invention.

In FIG. 6 is an arrangement 1 for separating a connection 3 between two pressurized flanged tube sections 5, 7 according to a further embodiment of the invention disclosed.

The embodiment in FIG. 6 differs from the embodiment in FIG. 1-5, in that the arrangement 1 further comprises a lock device 90 for controllably closing and opening an entrance to the channel 67 of the guide member 65, in which the obstruction 50 is adapted to be introduced and removed. Thereby, the obstruction 50 and various tools can be introduced into the closed compartment 52 between the first type element 10 and the second type element 12.

In the disclosed embodiment, the lock device 90 comprises a further obstruction 92 that is controllably displaceable into and out of the entrance to the channel 65, thereby opening and closing the entrance to the channel 65. When fully inserted, the further obstruction 92 is adapted to completely close the entrance to the channel 65. Accordingly, by means of the lock device 90, the obstruction 50 and various tools can be introduced into and removed from the closed compartment 52 while assuring that the closed compartment 52 is sufficiently sealed from the surrounding of the arrangement 1 thereafter.

The embodiment in FIG. 6 further differs from the embodiment in FIG. 1-5, in that the arrangement 1 comprising a cleansing tool adapted to be introduced into the gap 52 between the flanges 22, 32 of the first tube section 5 and the second tube section 7. Preferably, the cleansing tool comprises a structure holding one or more abrasive members for engaging with the at least one of the flanges 22, 32 of the first tube section 5 and the second tube section 7. The cleansing tool may have a similar configuration as the obstruction 50 with the difference that the cleansing tool is configured with the one or more abrasive members. The cleansing tool is not disclosed in FIG. 6. It shall be understood that further tools maybe introduced into the gap 52 between the flanges 22, 32 of first tube section 5 and the second tube section 7, such as a periscope or a camera for visual inspection.

The embodiment in FIG. 6 further differs from the embodiment in FIG. 1-5, in that the arrangement comprises a further guide member 95 for guiding the introduction and removal of the obstruction 50 and various tools into/out of the channel 67. The further guide member 95 comprises a further channel 97 adapted to be aligned with the channel 67 of the guide member 65 of the second type element 12. The further guide member 95 is adapted to be removable connected to the second type element 12 by means of a connection device, such a bolted connection to the second type element 12.

Figure 7:
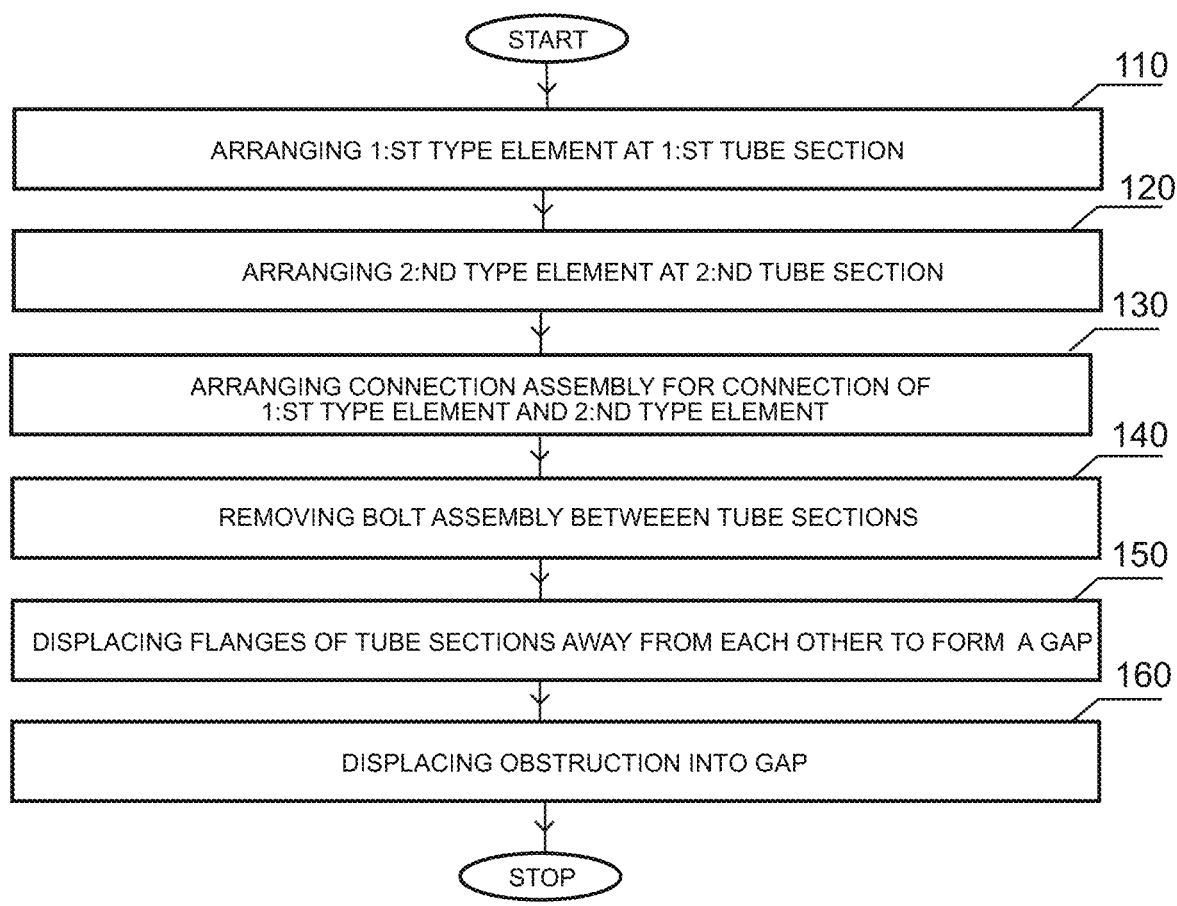
FIG. 7 discloses a flow chart of a method for separating a connection between two pressurized flanged tube sections according to an embodiment of the invention.

By means of the further guide member 95 introduction and removal of the obstruction 50 and various tools into/out of the channel 67 is facilitated. By means of configuring the further guide member 95 removable connected to the second type element 12, the extent of the arrangement 1 can be reduced when the arrangement 1 is in a static state. In FIG. 7, a flow chart of a method for separating a connection 3 between two pressurized flanged tube sections 5, 7 according to an embodiment of the invention is disclosed.

The method comprises, in a step 110, arranging the first type element 10 around a flange 22 of a first tube section 5. Thereby, a sealed connection is arranged to the flange 22 of the first tube section 5. Correspondingly, the method comprises, in a step 120, arranging the second type element 12 around a flange 32 of a second tube section 7 so that the first type element 10 and the second type element 12 form a sealed compartment 52 between the flange 22 of the first tube section 5 and the flange 32 of the second tube section 7. Accordingly, the second type element 12 provides a sealed connection to the flange 32 of the second tube section 7. Furthermore, the first type element 10 and the second type element 12 cooperatively create the sealed compartment 52 between the flanges 22, 32 of the two tube sections 5, 7.

The method further comprises, in a step 130, arranging a connection assembly 40 for connecting the first type element 10 and second type element 12 together. The connection assembly 40 assures that the first type element 10 and the second type element 12 are firmly connected to each other so the sealed compartment 52 is maintained.

In a step 140, the method comprises removing one or more bolts of a bolt assembly 60 between the flange 22 of the first tube section 5 and the flange 32 of the second tube section 7. Thereby, a displacement of the flanges 22, 32 of the two tube section 5, 7 in relation to each other is enabled.

In a step 150, the method comprises displacing the flange 22 of the first tube section 5 and the flange 32 of the second tube section 7 away from each other so that a gap 54 is formed within the sealed compartment 52 between the flange 22 of the first tube section 5 and the flange 32 of the second tube section 7. The displacement of the flanges 22, 32 of the two tube sections 5, 7 may be induced by the internal pressure at the connection 3 between the tube sections 5, 7. Alternatively, a force may be applied to separate the flanges 22, 32 from each other. Thereby, the gap 54 is formed between the flanges 22, 32 within the sealed compartment 52.

In a step 160, the method comprises displacing the obstruction 50 into the gap 54 between the flange 22 of the first tube section 5 and the flange 32 of the second tube section 7. Thereby, the opening of the second tube section 7 is closed and the second tube section 7 is isolated from the first tube section 5, and the repair or replacement operation on the first tube section 5 may be started.

Figure 8:
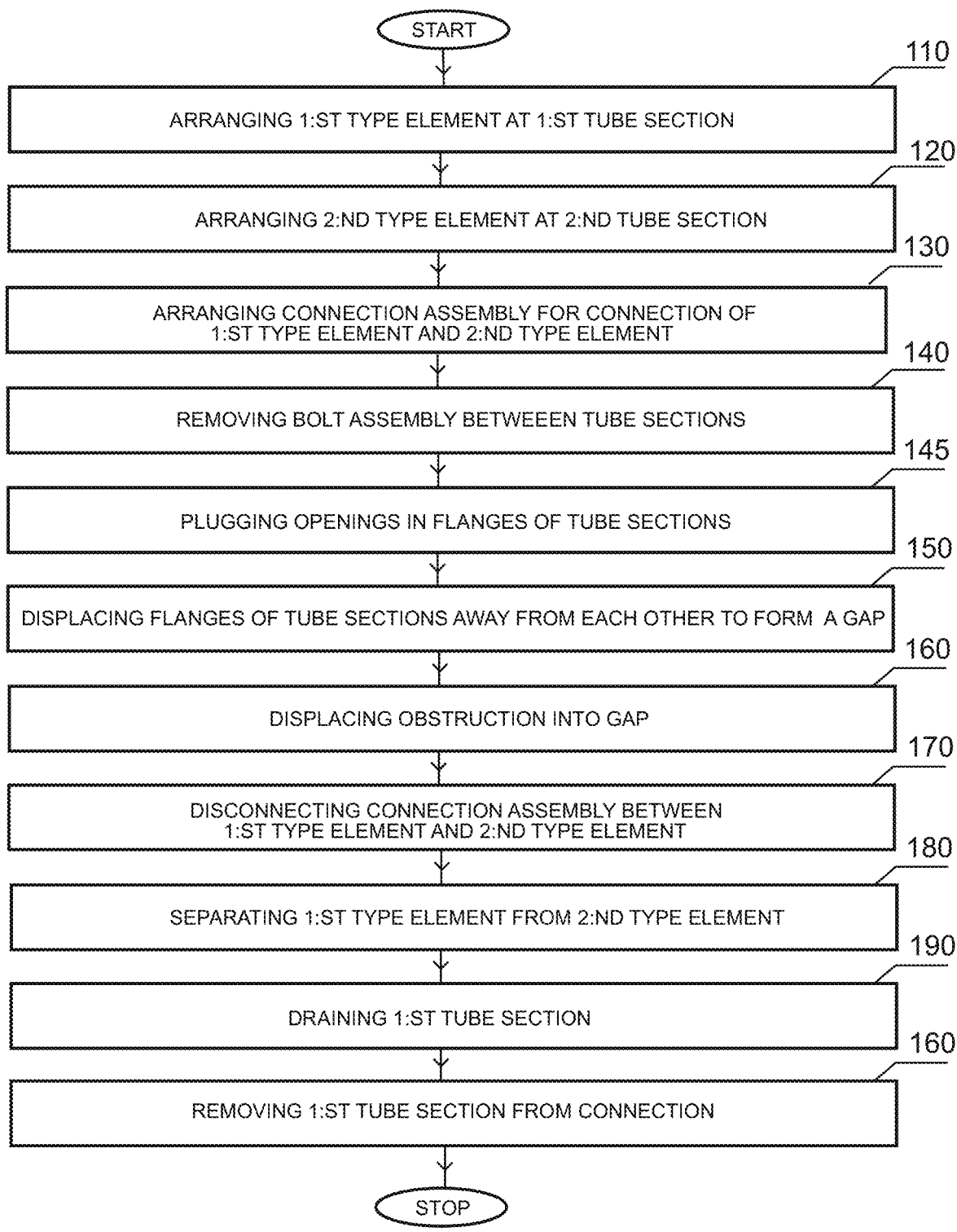
FIG. 8 discloses a flow chart of a method for separating a connection between two pressurized flanged tube sections according to a further embodiment of the invention.

In FIG. 8 a flow chart of a method for separating a connection 3 between two pressurized flanged tube sections 5, 7 according to a further embodiment of the invention is disclosed.

The further embodiment of the method differs from the embodiment in FIG. 7 in that the method further comprises, in a step 145, plugging one or more opening in in the flanges 22, 32 of the first tube section 5 and the second tube section 7 formed after the removal of the bolt assembly 60. By means of providing plugs 62 to the opening in the flanges 22, 32 of the tube sections 5, 7, a leakage of the medium to an outside is prevented.

In a step 170, the method further comprises disconnecting the connection assembly 40 between the first type element 10 and second type element 12, and in a step 180, separating the first type element 10 from the second type element 12. Thereby, the sealed compartment 52 is opened up for the removal of the first tube section 5.

In a step 190, the method comprise draining the first tube section 5 and possible tube sections connected to the first tube section 5. Thereby, the first tube section 5 is prepared for removal. In a step 195, the method comprises removing the first tube section 5 from the connection 3.

Figure 9:
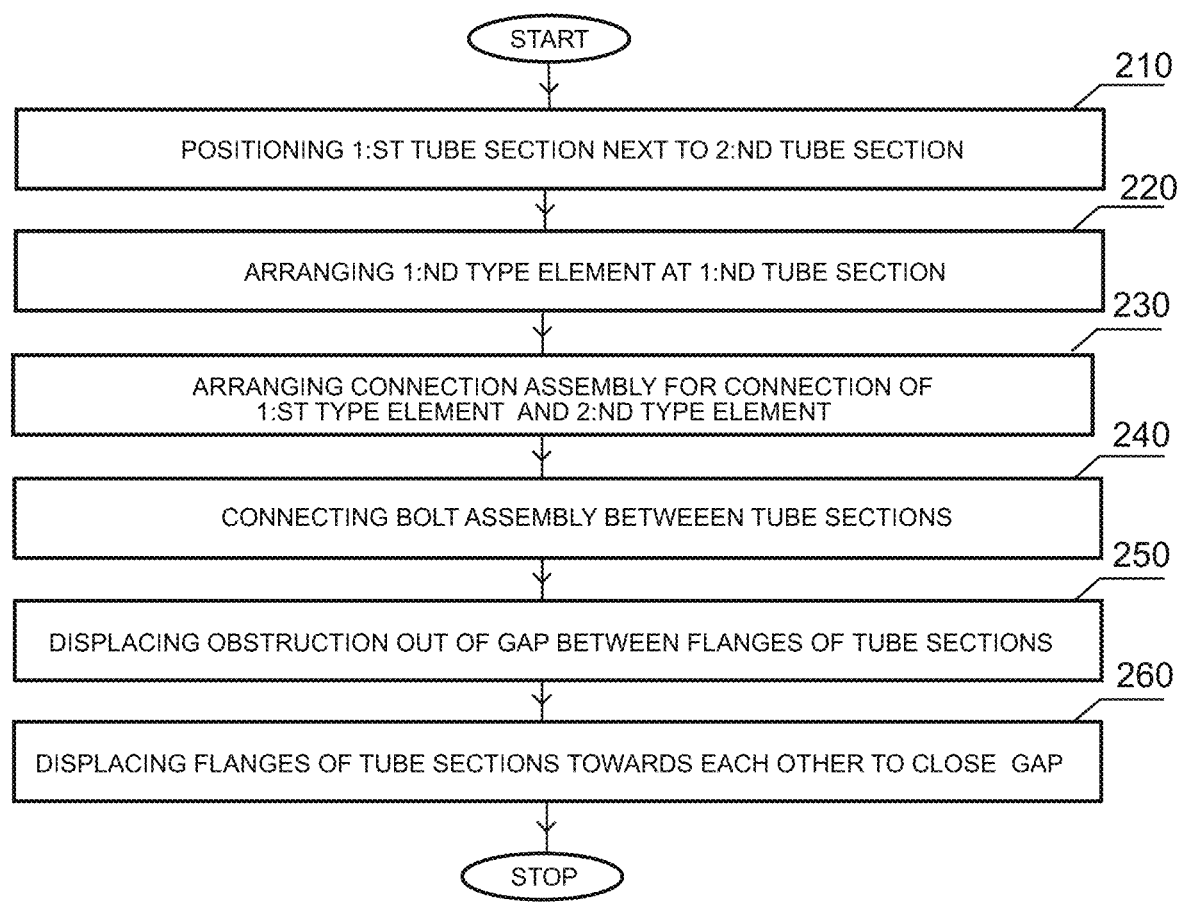
FIG. 9 discloses a flow chart of a method for re-establishing a connection of a first tube section to a pressurized isolated second tube section according to an embodiment of the invention.

In FIG. 9 a flow chart of a method for re-establishing a connection 3 of a first tube section 5 to a pressurized isolated second tube section 7 according to an embodiment of the invention is disclosed.

The method comprises, in a step 210, positioning the first tube section 5 next to the second tube section 7, and in a step 220, arranging the first type element 10 around a flange 22 of the first tube section 5 of the connection 3 to be formed so that the first type element 10 and the second type element 12 form a sealed compartment 52 between the flange 22 of the first tube section 5 and the flange 32 of the second tube section 7. The second type element 12 being arranged around the flange 32 of the second tube section 7 and the obstruction 50 being inserted in the gap 54 so that the obstruction 50 isolates the opening of the second tube section 7. The first type element 10 and the second type element 12 are arranged in engagement so that the sealed compartment 52 is formed between the flanges 22, 32 of the two tube sections 5, 7.

The method comprises, in a step 230, arranging a connection assembly 40 for connecting the first type element 10 and second type element 12 together. Thereby, it is assured that the first type element 10 and the second type element 12 are firmly attached together. The method further comprises, in a step 240, connecting one or more bolts to form a bolt assembly 60 between the flange 22 of the first tube section 5 and the flange 32 of the second tube section 7. Thereby, a connection is formed that holds the flanges 22, 32 of the two tube sections 5, 7 together.

The method comprises, in a step 250, displacing the obstruction 50 out of the gap 54 between the flanges 22, 32 of the two tube sections 5, 7. Thereby, the medium within the tubing is allowed to flow from the second tube section 7 to the first tube section 5. Thereafter, the method comprises, in a step 260, displacing the flange 22 of the first tube section 5 and the flange 32 of the second tube section 7 towards each other so that the gap 54 between the flanges 22, 32 of the two tube sections 5, 7 is closed. Thereby, the connection 3 between the first tube section 5 and the second tube section 7 has been re-established while the second tube section 7 was in a pressurized state.

Figure 10:
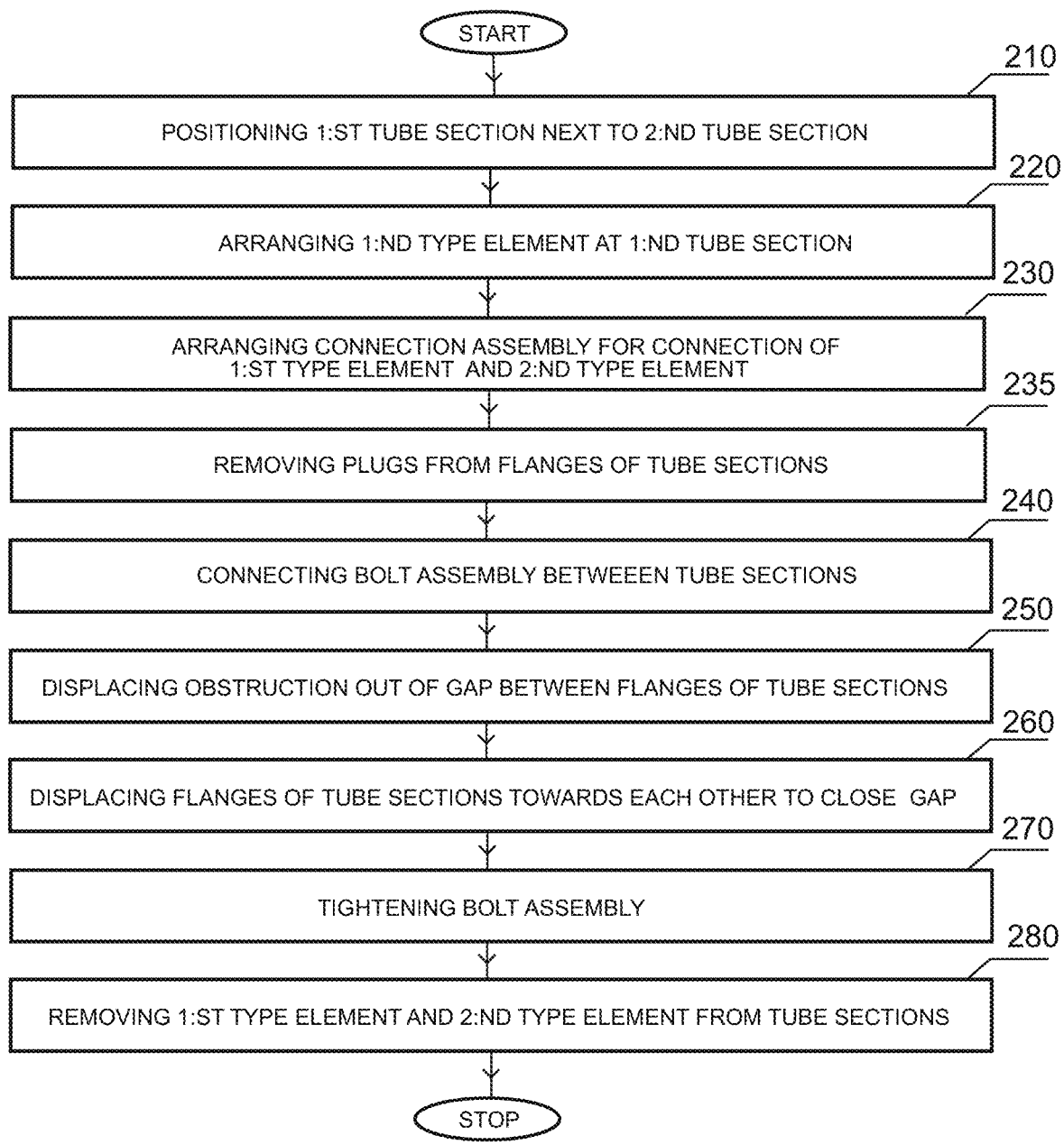
FIG. 10 discloses a flow chart of a method for re-establishing a connection of a first tube section to a pressurized isolated second tube section according to a further embodiment of the invention.

In FIG. 10 a flow chart of a method for re-establishing a connection 3 of a first tube section 5 to a pressurized isolated second tube section 7 according to a further embodiment of the invention is disclosed.

The further embodiment of the method differs from the embodiment in FIG. 9 in that the method further comprises, in a step 235, removing one or more plugs 62 from one or more opening in the flanges 22, 32 of the first tube section 5 and the second tube section 7 prior to connecting one or more bolts to form a bolt assembly 60 between the flanges 22, 32. Moreover, the further embodiment comprises, in a step 270, tightening the bolt assembly 60 between the flange 22 of the first tube section 5 and the flange 32 of the second tube section 7. Thereby, a firm attachment of the flanges 22, 32 of the connection 3 between the first tube section 5 and the second tube section 7 is assured. The method further comprises, in a step 280, removing the first type element 10 from the first tube section 5 and the second type element 12 from the flange 32 of a second tube section 7. The connection 3 has been re-established and the sealed compartment 52 over the flanges 22, 32 of the two tube sections 5, 7 is no longer necessary.

Figure 11:
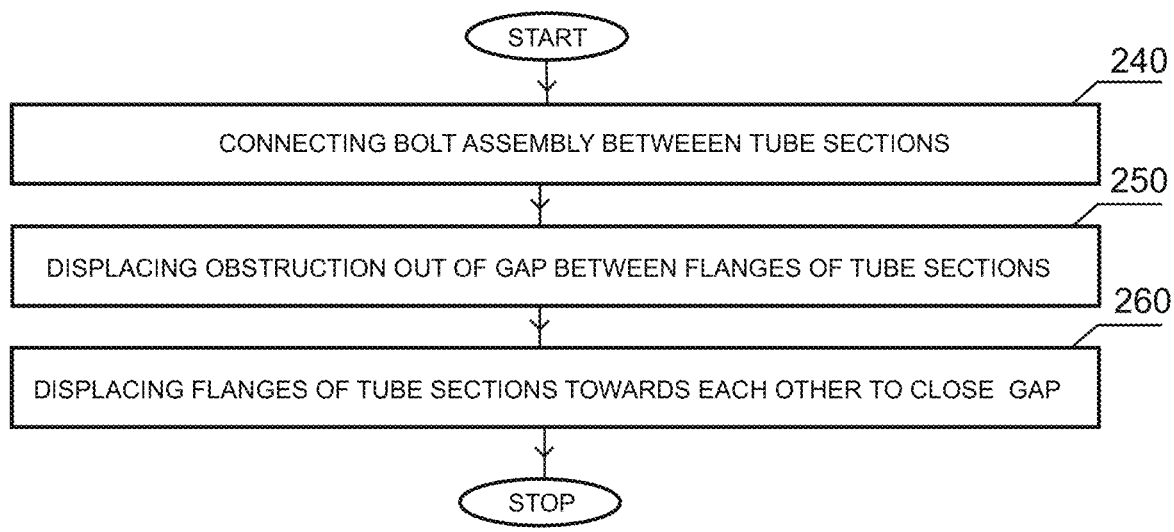
FIG. 11 discloses a flow chart of a method for re-establishing a connection of a first tube section to a pressurized isolated second tube section according to yet another embodiment of the invention.

In FIG. 11 a flow chart of a method for re-establishing a connection of a first tube section 5 to a pressurized isolated second tube section 7 according to yet another embodiment of the invention is disclosed. The embodiment in FIG. 11 differs from the embodiment in FIG. 9 in that the method is initiated from a state, in which the first type element 10 is positioned around a flange 22 of the first tube section 5 and the second type element 12 is positioned around the flange 32 of the second tube section 7 so that the first type element 10 and the second type element 12 form the sealed compartment 52 between the flanges 22, 32 of the first tube section 5 and the second tube section 7.

The method comprises, in a step 240, connecting one or more bolts to form a bolt assembly 60 between the flange 22 of the first tube section 5 and the flange 32 of the second tube section 7. Thereby, a connection is formed that holds the flanges 22, 32 of the two tube sections 5, 7 together.

The method comprises, in a step 250, displacing the obstruction 50 out of the gap 54 between the flanges 22, 32 of the two tube sections 5, 7. Thereby, the medium within the tubing is allowed to flow from the second tube section 7 to the first tube section 5. Thereafter, the method comprises, in a step 260, displacing the flange 22 of the first tube section 5 and the flange 32 of the second tube section 7 towards each other so that the gap 54 between the flanges 22, 32 of the two tube sections 5, 7 is closed. Thereby, the connection 3 between the first tube section 5 and the second tube section 7 has been re-established while the second tube section 7 was in a pressurized state.

Figure 12:
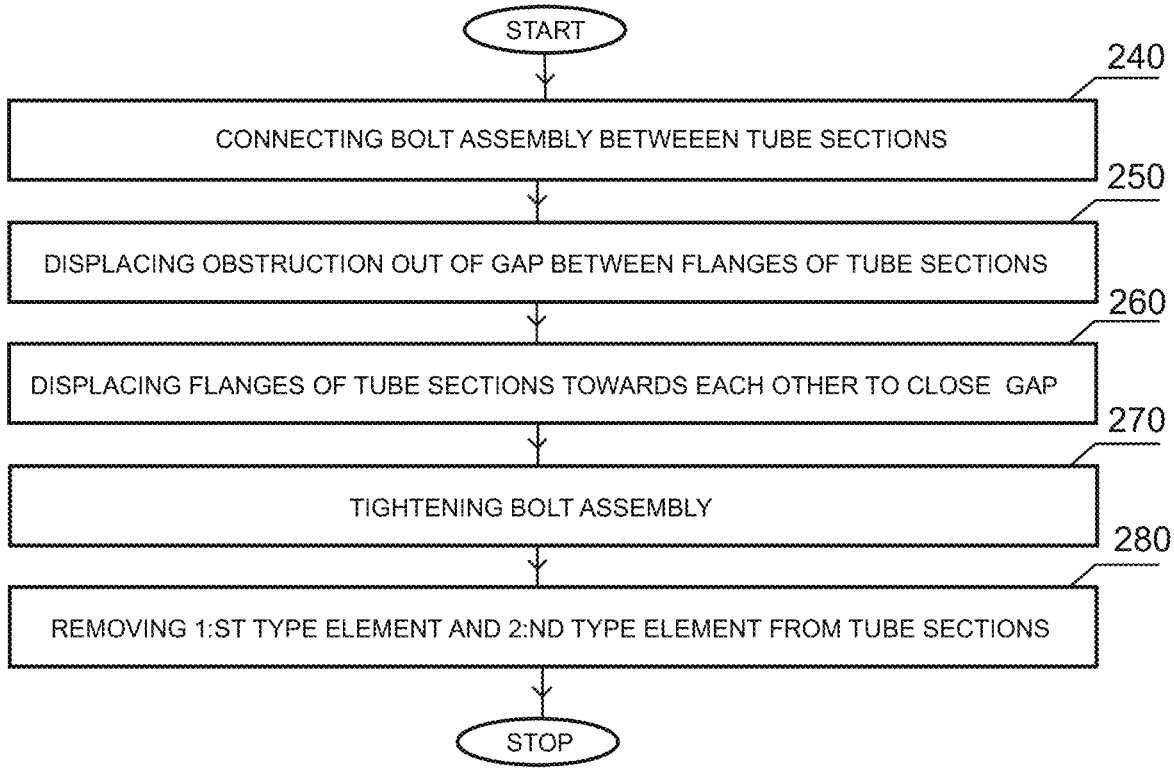
FIG. 12 discloses a flow chart of a method for re-establishing a connection of a first tube section to a pressurized isolated second tube section according to yet another embodiment of the invention.

In FIG. 12 a flow chart of a method for re-establishing a connection 3 of a first tube section (5) to a pressurized isolated second tube section (7) according to yet another embodiment of the invention is disclosed.

The embodiment in FIG. 12 differs from the embodiment in FIG. 11, in that the method comprises, in a step 270, tightening the bolt assembly 60 between the flange 22 of the first tube section 5 and the flange 32 of the second tube section 7. Thereby, a firm attachment of the flanges 22, 32 of the connection 3 between the first tube section 5 and the second tube section 7 is assured. The method further comprises, in a step 280, removing the first type element 10 from the first tube section 5 and the second type element 12 from the flange 32 of a second tube section 7. The connection 3 has been re-established and the sealed compartment 52 over the flanges 22, 32 of the two tube sections 5, 7 is no longer necessary. It should be noted that the above-mentioned embodiments illustrate rather than limit the invention, and that those skilled in the art will be able to design many alternative embodiments without departing from the scope of the appended claims.

For example, it shall be understood that the first body 20 of the first type element 10 and the second body 30 of the second type element 12 may be of any suitable material for the purpose of forming the sealed compartment 52. The first body 20 and second body 30 comprise for example mainly a metallic construction material, such as steel, stainless steel, aluminum, etcetera, or a polymeric construction material, such Polypropylene, Polyurethane, Polyvinylchloride, etcetera. Likewise, it shall be understood that sealing arrangements 24, 34, 70, 84 and the obstruction 50 may be of any suitable material for sealing against the applicable material of the first tube section 5 and second tube section 7.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. An arrangement for separating a connection between two pressurized flanged tube sections, the arrangement comprising:

a first type element comprising a first body adapted to be arranged around a flange of a first tube section of said connection, and which first body comprising a first sealing arrangement;

a second type element comprising a second body adapted to be arranged around a flange of a second tube section of said connection, and which second body comprising a second sealing arrangement, and wherein the second type element further comprises a displaceable obstruction;

wherein the first type element and the second type element are adapted to form a sealed compartment between the flange of the first tube section and the flange of the second tube section, and the first sealing arrangement and the second sealing arrangement are adapted to maintain the sealing of the sealed compartment while allowing the flange of the first tube section and the flange of the second tube section to be displaced away from each other so that a gap is formed, which allows the obstruction to enter and isolate the second tube section;

wherein the first sealing arrangement comprises a first sealing adapted to be in abutment with the flange of the first tube section and the second sealing arrangement comprises a second sealing adapted to be in abutment with the flange of the second tube section; and wherein the first sealing and the second sealing are ring-formed and are adapted to abut along an outer circumference of the flanges of the respective first tube section and second tube section.

2. The arrangement according to claim 1, wherein the second type element further comprises a guide member adapted to guide the displacement of the obstruction from an open position in which the obstruction is outside said gap between the flanges and a closed position in which the obstruction isolates an opening of the second tube section.

3. The arrangement according to claim 2, wherein the guide member comprises a channel in the second body.

4. The arrangement according to claim 3, wherein the arrangement comprises a further guide member for guiding an introduction of the obstruction into the channel, wherein the further guide member is adapted to be removably connected to the second type element.

5. The arrangement according to claim 1, wherein the arrangement further comprises a cleansing tool adapted to be introduced into the gap between the flange of the first tube section and the flange of the second tube section.

6. The arrangement according to claim 5, wherein the cleansing tool comprises a structure holding one or more abrasive members for engaging with the at least one of the flanges of the first tube section and the second tube section.

7. The arrangement according to claim 1, wherein the arrangement further comprises a third sealing arrangement between the second body and the obstruction.

8. The arrangement according to claim 7, wherein the third sealing arrangement comprises a pair of third sealings.

9. The arrangement according to claim 1, wherein the first body comprises a first flanged part and the second body comprises a second flanged part, and the arrangement further comprises a connection assembly for connecting the first flange part and the second flanged part together adjustable spaced apart from each other.

10. The arrangement according to claim 9, wherein the first body comprises a protruding part adapted to protrude perpendicular to an extension of the first flanged part and the second body comprises a recess directed perpendicular to an extension of the second flanged part, wherein a shape of the protruding part and a shape of the recess are complementary for enabling displacement of the protruding part within the recess.

11. The arrangement according to claim 10, wherein the protruding part of the first body comprises a tubular element and the recess of the second body comprises a tubular depression.

12. The arrangement according to claim 10, wherein the arrangement comprises a fourth sealing arrangement positioned in abutment between a wall section of said protruding part and a wall section of said recess.

13. The arrangement according to claim 12, wherein the fourth sealing arrangement comprises a fourth ring-formed sealing.

14. An arrangement for separating a connection between two pressurized flanged tube sections, the arrangement comprising:

a first type element comprising a first body adapted to be arranged around a flange of a first tube section of said connection, and which first body comprising a first sealing arrangement;

a second type element comprising a second body adapted to be arranged around a flange of a second tube section of said connection, and which second body comprising a second sealing arrangement, and wherein the second type element further comprises a displaceable obstruction;

wherein the first type element and the second type element are adapted to form a sealed compartment between the flange of the first tube section and the flange of the second tube section, and the first sealing arrangement and the second sealing arrangement are adapted to maintain the sealing of the sealed compartment while allowing the flange of the first tube section and the flange of the second tube section to be displaced away from each other so that a gap is formed, which allows the obstruction to enter and isolate the second tube section;

wherein the second type element further comprises a guide member adapted to guide the displacement of the obstruction from an open position in which the obstruction is outside said gap between the flanges and a closed position in which the obstruction isolates an opening of the second tube section;

wherein the guide member comprises a channel in the second body; and wherein the arrangement comprises an entrance to the channel for introducing the obstruction and a lock device for controllably closing and opening the entrance to the channel.

15. The arrangement according to claim 14, wherein the lock device comprises a further obstruction controllably displaceable into and out of the entrance to the channel for opening and closing the entrance to the channel.

16. An arrangement for separating a connection between two pressurized flanged tube sections, the arrangement comprising:

a first type element comprising a first body adapted to be arranged around a flange of a first tube section of said connection, and which first body comprising a first sealing arrangement;

a second type element comprising a second body adapted to be arranged around a flange of a second tube section of said connection, and which second body comprising a second sealing arrangement, and wherein the second type element further comprises a displaceable obstruction;

wherein the first type element and the second type element are adapted to form a sealed compartment between the flange of the first tube section and the flange of the second tube section, and the first sealing arrangement and the second sealing arrangement are adapted to maintain the sealing of the sealed compartment while allowing the flange of the first tube section and the flange of the second tube section to be displaced away from each other so that a gap is formed, which allows the obstruction to enter and isolate the second tube section; and wherein the first body and the second body comprises respective openings for enabling removal of one or more bolts of a bolt assembly between the flange of the first tube section and the flange of the second tube section.

17. A method for separating a connection between two pressurized flanged tube sections by means of an arrangement comprising a first type element comprising a first body comprising a first sealing arrangement, and a second type element comprising a second body comprising a second sealing arrangement, and wherein the second type element further comprises a displaceable obstruction, wherein the method comprises:

arranging the arrangement on the connection so that the first type element is positioned around a flange of a first tube section and the second type element is positioned around a flange of a second tube section, and so that the first type element and the second type element form a sealed compartment between the flange of the first tube section and the flange of the second tube section, arranging a connection assembly so that the first type element and second type element exert a force on the flanges of the first tube section and the second tube section, removing one or more bolts of a bolt assembly between the flange of the first tube section and the flange of the second tube section, displacing the flange of the first tube section and the flange of the second tube section away from each other so that a gap is formed within the sealed compartment between the flange of the first tube section and the flange of the second tube section, and displacing the obstruction into the gap between the flange of the first tube section and the flange of the second tube section.

18. The method according to claim 17, wherein one or more openings are defined in each of the flanges of the first tube section and the second tube section, wherein the one or more openings are configured to receive the one or more bolts of a bolt assembly between the flange of the first tube section and the flange of the second tube section, and wherein the method further comprises:

plugging the one or more opening in in the flanges of the first tube section and the second tube section after the removal of the bolt assembly.

19. The method according to claim 17, wherein the method comprises:

arranging the first type element around a flange of a first tube section of said connection, and arranging the second type element around a flange of a second tube section of said connection so that the first type element and the second type element form a sealed compartment between the flange of the first tube section and the flange of the second tube section.

20. The method according to claim 17, wherein the method further comprises:

disconnecting the connection assembly between the first type element and second type element, separating the first type element from the second type element, draining the first tube section and possible tube sections connected to the first tube section, and removing the first tube section from the connection.

21. A method for re-establishing a connection of a first tube section to a pressurized isolated second tube section by means of an arrangement comprising a first type element comprising a first body with a first sealing arrangement, and a second type element comprising a second body with a second sealing arrangement, and wherein the second type element further comprises a displaceable obstruction, where the second type element is arranged around a flange of the second tube section, wherein the method comprises:

positioning the first tube section next to the second tube section, arranging the first type element around a flange of the first tube section of said connection to be formed so that the first type element and the second type element forms a sealed compartment between the flange of the first tube section and the flange of the second tube section, arranging a connection assembly for connecting the first type element and second type element together, connecting one or more bolts to form a bolt assembly between the flange of the first tube section and the flange of the second tube section, displacing the obstruction out of a gap between the flanges of the two tube sections, and displacing the flange of the first tube section and the flange of the second tube section towards each other so that said gap formed between the flanges of the two tube sections is closed.

22. The method according to claim 21, wherein the method comprises:

removing one or more plugs from one or more opening in the flanges of the first tube section and the second tube section prior to connecting one or more bolts to form a bolt assembly between the flanges.

23. The method according to claim 21, wherein the method comprises:

tightening the bolt assembly between the flange of the first tube section and the flange of the second tube section, and removing the first type element from the first tube section and the second type element from the second tube section.

24. A method for re-establishing a connection of a first tube section to a pressurized isolated second tube section by means of an arrangement comprising a first type element comprising a first body with a first sealing arrangement, and a second type element comprising a second body with a second sealing arrangement, and wherein the second type element further comprises a displaceable obstruction, where the first type element is positioned around a flange of a first tube section and the second type element is positioned around a flange of a second tube section so that the first type element and the second type element form a sealed compartment between the flange of the first tube section and the flange of the second tube section, wherein the method comprises the steps of:

connecting one or more bolts to form a bolt assembly between the flange of the first tube section and the flange of the second tube section, displacing the obstruction out of a gap between the flanges of the two tube sections, and displacing the flange of the first tube section and the flange of the second tube section towards each other so that said gap formed between the flanges of the two tube sections is closed.

25. The method according to claim 24, wherein the method comprises:
removing one or more plugs from one or more opening in the flanges of the first tube section and the second tube section prior to connecting one or more bolts to form a bolt assembly between the flanges.

26. The method according to claim 24, wherein the method comprises:
tightening the bolt assembly between the flange of the first tube section and the flange of the second tube section, and
removing the first type element from the first tube section and the second type element from the second tube section.

* * * * *